May 27, 1952  I. MONK  2,597,890
ROTARY POWER UNIT OPERABLE ON ATMOSPHERIC ENERGY
Filed Dec. 20, 1949  4 Sheets-Sheet 1
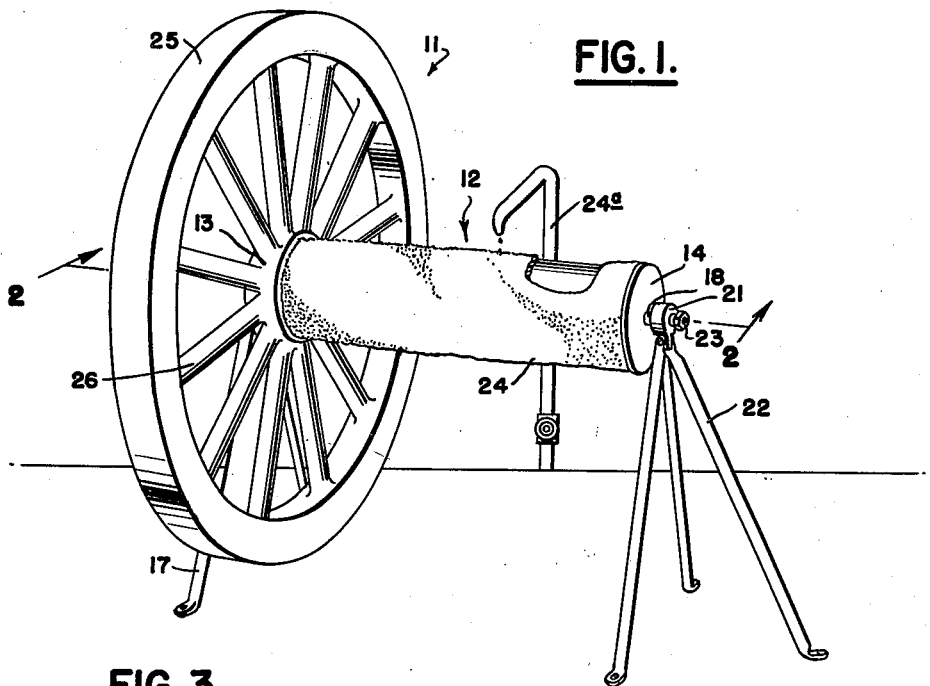
FIG. 1.
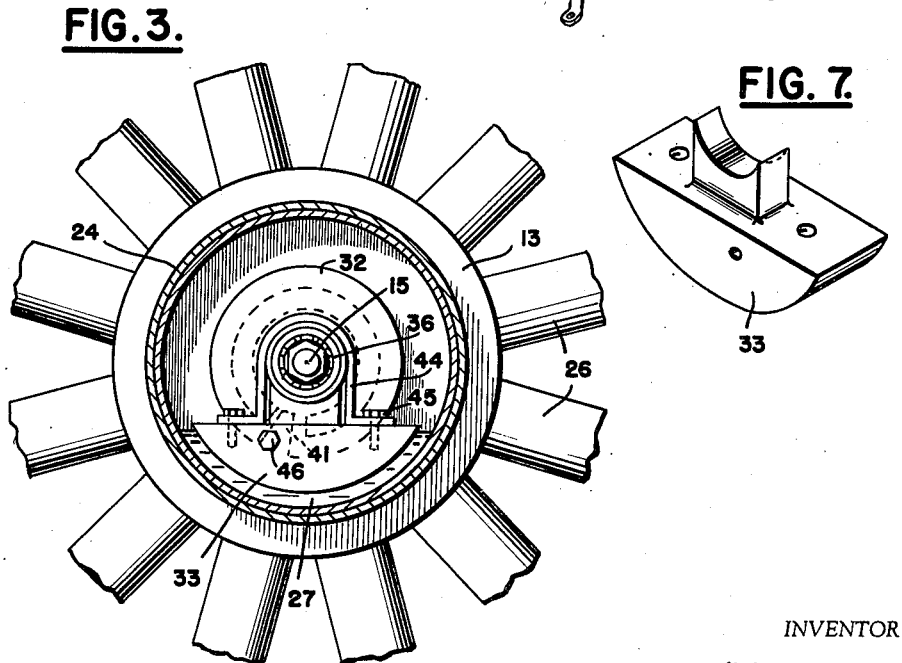
FIG. 3.
FIG. 7.
INVENTOR
IVAN MONK
BY
ATTORNEY May 27, 1952     I. MONK     2,597,890
ROTARY POWER UNIT OPERABLE ON ATMOSPHERIC ENERGY
Filed Dec. 20, 1949     4 Sheets-Sheet 2
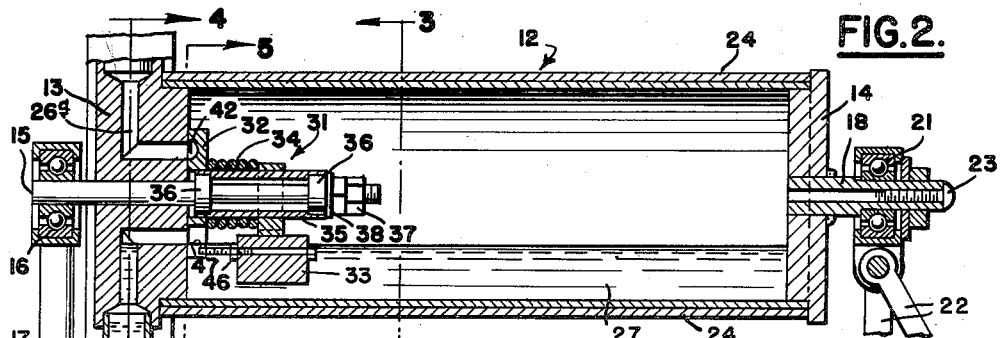
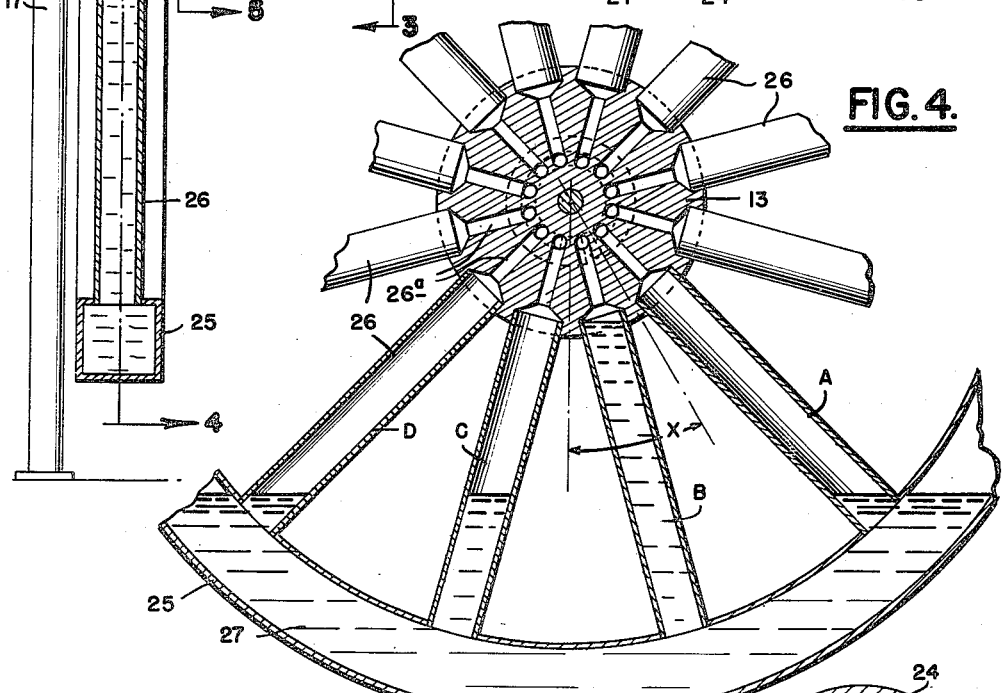
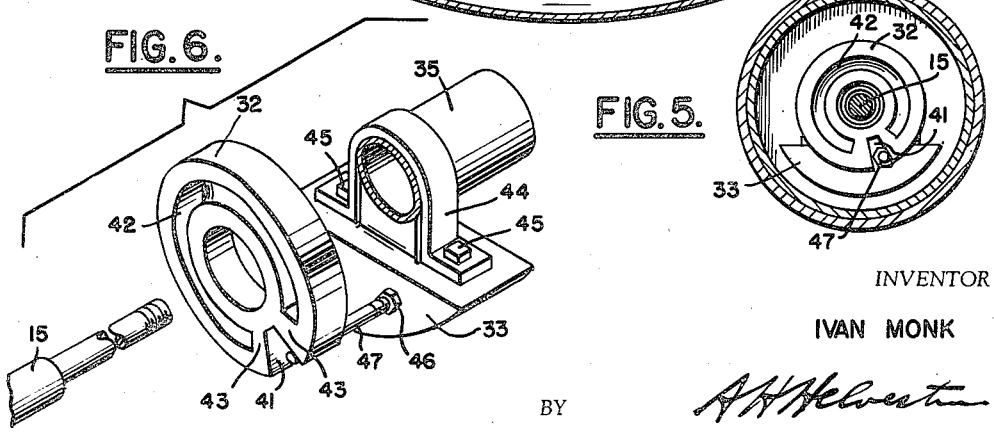
INVENTOR
IVAN MONK
BY
ATTORNEY May 27, 1952     I. MONK     2,597,890
ROTARY POWER UNIT OPERABLE ON ATMOSPHERIC ENERGY
Filed Dec. 20, 1949     4 Sheets-Sheet 3
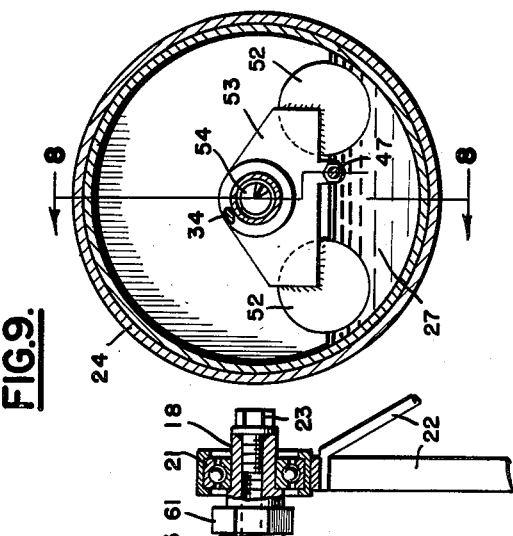
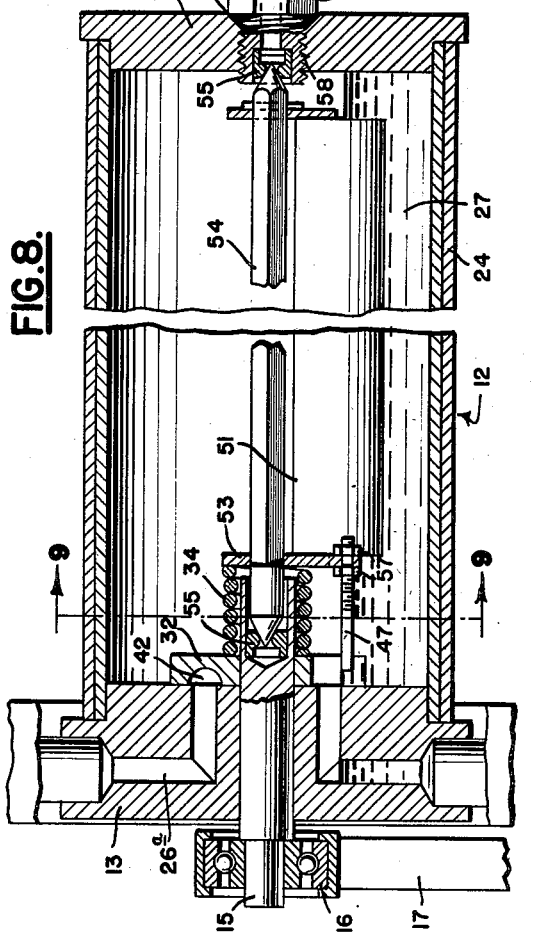
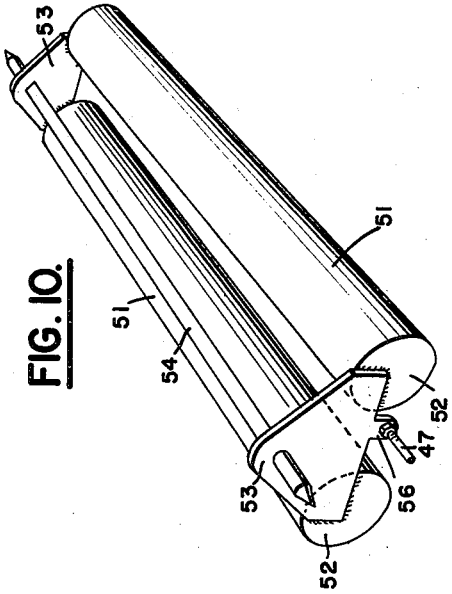
INVENTOR
IVAN MONK
ATTORNEY

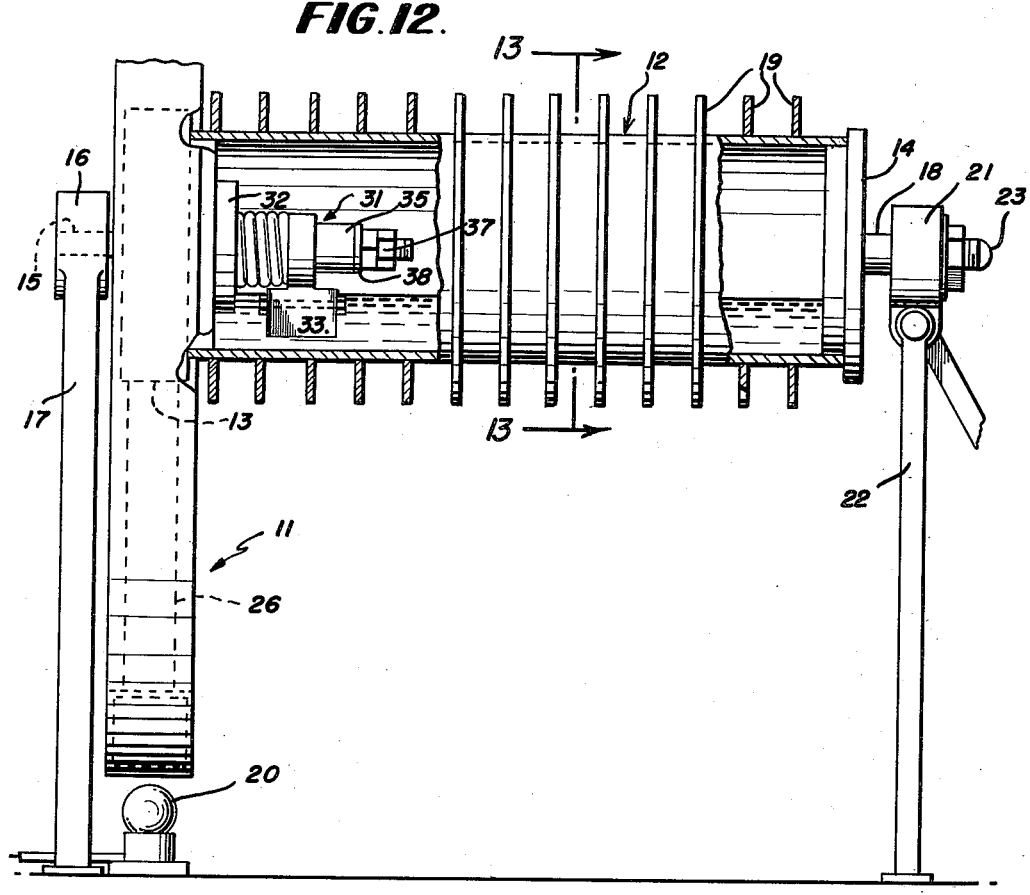
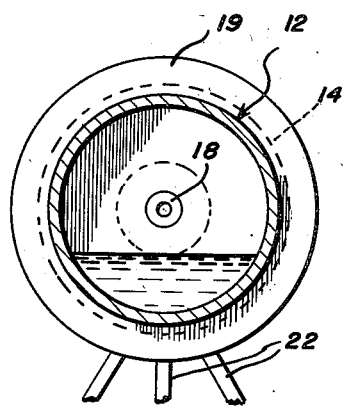

Patented May 27, 1952

2,597,890

UNITED STATES PATENT OFFICE 2,597,890

ROTARY POWER UNIT OPERABLE ON ATMOSPHERIC ENERGY

Ivan Monk, United States Navy, Washington, D. C.

Application December 20, 1949, Serial No. 134,061

12 Claims. (Cl. 60—25)

(Granted under the act of March 3, 1883, as amended April 30, 1928; 370 O. G. 757)

The present invention relates to a power unit for amusement devices, toys, clocks, or the like, and more particularly to a rotary power unit which requires no fuel but which operates under conditions of small differences in temperature.

Toys, clocks, amusement and advertising devices and the like, which have movable parts, require some type of motive power for their operation, and usually this motive power is supplied by a motor of one kind or another, such as electrical, vibratory or spring-urged, and in each case a power source is needed, whether it be a battery, a spring, or otherwise. It has been found that such devices require considerable attention, and in order for them to function constantly, they must be rewound, reset, or the batteries replaced at frequent intervals. Over a period of time this procedure becomes not only bothersome, but also expensive.

The present invention is self-contained and self-sufficient for power purposes, and it will operate indefinitely solely by the heat of the surroundings, with practically no attention or supervision, and in addition it is comparatively inexpensive to manufacture. Furthermore, the device will operate over long periods of time, and requires no resetting, rewinding, or batteries.

An object of the present invention is the provision of a power unit which operates under conditions of small differences in temperature.

Another object is to provide a power unit which operates on energy obtained from the atmosphere.

Another object is to provide a power unit which operates without fuel.

A further object is to provide a rotary power unit whose working fluid is hermetically sealed within the power unit.

Still another object is the provision of a power unit which is entirely self-contained, requires no adjustment, and which will operate over long periods of time reliably and without supervision.

Yet another object is the provision of a rotary power unit which operates through the action of gravity upon an unsymmetrical distribution of fluid contained within the power unit.

A final object is to provide a novel rotary power unit which possesses utility as an aid to training advertising, amusement and the like.

The exact nature of this invention as well as other objects and advantages thereof will be readily apparent from consideration of the following specification relating to the annexed drawings wherein:

Fig. 1 shows a perspective view of a preferred embodiment of the invention.

Fig. 2 shows a sectional view taken along the line 2—2 of Fig. 1 looking in the direction of the arrows.

Fig. 3 illustrates a sectional view taken along the line 3—3 of Fig. 2, looking in the direction of the arrows.

Fig. 4 is an enlarged sectional view of the wheel and hub taken along the line 4—4 of Fig. 2.

Fig. 5 shows a sectional view taken along the line 5—5 of Fig. 2 looking in the direction of the arrows.

Fig. 6 illustrates an enlarged perspective view of the valve plate and pendulum elements of the valve assembly.

Fig. 7 shows an enlarged view of the pendulum.

Fig. 8 illustrates a modification of the valve assembly wherein floats are employed in place of a pendulum; the view being taken along the line 8—8 of Fig. 9.

Fig. 9 is an end view, taken along the line 9—9 of Fig. 8, looking in the direction of the arrows.

Fig. 10 is a perspective view of the float assembly.

Fig. 11 shows an alternate position for the filling-plug.

Figure 12 is a view showing a modification of the invention.

Figure 13 is a view along line 13—13 of Figure 12, looking in the direction of the arrows.

Referring now to the drawings, wherein like reference characters designate like or corresponding parts throughout the several views, there is shown in Fig. 1 (which illustrates a preferred embodiment), a perspective view of the power unit which has the general appearance of a wheel 11 with a cylinder 12 integrally attached to the hub 13 of the wheel; the cylinder 12 having an end cap 14 sealed thereto. The wheel 11, which will be more fully described hereinafter, has a metal hub 13, and the cylinder 12 is also of some thin metal such as brass, copper, or the like, whereby the joints between hub 13 and cylinder 12, as well as between cylinder 12 and end cap 14 may be soldered, sweated, or brazed to thereby form a hermetically sealed compartment within the cylinder 12 which is capable of containing a fluid under pressure or vacuum without leaking.

Rigidly attached to hub 13 is a hub shaft 15 which is supported in bearings 16; the bearings 16 being in turn mounted in pedestal 17. At the opposite end of cylinder 12, and rigidly attached to end cap 14, is a hollow cap shaft 18 which is supported in bearings 21; the bearings 21 being mounted in a pedestal 22. It is desirable that the entire power unit be mounted so as to rotate as freely as possible, and therefore any well known means, such as jewels or the like, may be employed to mount the supporting shafts. Within the exposed end of cap shaft 18 there is screwed a filling plug 23, which serves to hermetically seal the cylinder 12 after the fluid (to be more fully described hereinafter) is inserted by means of the hollow shaft 18.

Completely encasing the entire exterior surface of cylinder 12 is a wick 24, of cloth or similar material, which when it is dampened with water, or other fluid, acts to cool the cylinder 12 through evaporation; the importance of which will become apparent from the disclosure of the operation discussed hereinafter. For continued operation of the device over long periods of time, any well known method of maintaining the wick 24 wet, such as a siphon system (not shown) or a continual drip pipe 24a may be employed.

The element 11, which has the general appearance of a wheel, consists of a hollow rim 25 which is concentric with the axis of cylinder 12 and hub 13; the said rim 25 being held rigidly to the hub 13 by means of a plurality of equally spaced, hollow spokes 26, each spoke communicating with the interior of cylinder 12 by means of a passage 26a in the hub. The rim 25, which is constructed of any light weight, good heat conducting material, may have a cross section of any convenient shape, such as one of square cross-section as shown in Figs. 1 and 2, or one of circular cross-section. Other forms may be used also, provided the internal volume of the rim and spokes is approximately uniform around the wheel.

Experience has shown that for efficient operation of the power unit, that any transfer of heat from the relatively high temperature region of rim 25 to the relatively low temperature region of the cylinder 12, by conduction along the spokes 26, should be kept to a minimum. This may be done by reducing the heat transfer along the spokes, an expedient which might be accomplished by making the spokes 26 as thin as possible and of material which is a poor conductor of heat. Such material for the spokes might be glass, plastic, thin brass, nickel-silver, or the like or with a layer of insulating material or synthetic rubber and cement between the surfaces of the spokes and hub 13.

Partially filling the hollow interior of the wheel assembly 11, and the cylinder 12, is a volatile liquid 27, whose vapor fills the remaining space within the device when all air and relatively non-condensible gases have been removed. It is desirable that the liquid 27 be some non-corrosive fluid having a boiling point (at atmospheric pressure) at somewhat below that of water, and that it also have the fluid characteristics of low viscosity, high liquid specific gravity, large changes in vapor pressure for small changes in temperature, low specific heat for vapor and liquid, large specific volume for the vapor and low latent heat of vaporization. Liquids such as trichloroethylene, methylene chloride, and those of the "freon" class, such as trichloromonofluoromethane, dichlorotetrafluoroethane or trichlorotrifluoroethane, or the like, have been found satisfactory since they readily form a vapor at the temperature of the rim 25, and just as readily condense back to a liquid in the relatively cool confines of cylinder 12.

Within the cylinder 12 and freely rotatably mounted upon the inner end of hub shaft 15, is a valve assembly 31 consisting of a valve plate 32, a pendulum 33, and a spring 34. Concentric with the shaft 15 is a short sleeve 35, which is mounted upon bearings 36, and held in position by means of a nut 37 and washer 38. Freely mounted upon the sleeve 35 is the valve plate 32, better seen in the enlarged view of Fig. 6, which consists of a circular plate having a radial slot 41 extending from its outer periphery approximately half the distance to its inner diameter, said slot having a width approximately equal to the diameter or width of the passages 26a through hub 13. The valve plate 32 acts as a self-aligning sliding seal over the ends of the passages 26a in the hub which lead to the spokes 26, whereby the slot 41 functions to permit selected spokes to communicate with the interior of cylinder 12 as will be fully described later.

The valve plate 32 also contains, on its hub side, an annular groove 42 (Fig. 6) whose ends terminate on each side of slot 41 so that the distances 43 between the slot and each end of the groove is approximately equal to or slightly greater than the diameter or width of the passage openings 26a, thereby permitting the distance 43 to block the opening to one spoke while the groove 42 functions to equalize the pressures among those spokes whose passages 26a communicate with the groove.

Inasmuch as the entire valve assembly 31 is constructed so that it is prevented, by the pendulum 33, from rotating when the wheel 11 rotates, it is desirable that the coefficient of friction between the hub 13 and valve plate 32 be kept at a minimum, and it has been found that both carbon and brass, for the valve plate 32 accomplishes the desired result.

The pendulum 33, clearly seen in enlarged Figs. 6 and 7, consists of an arcuate-shaped piece of lead, or the like, which is rigidly attached to sleeve 35 by means of a strap 44 and bolts 45 so that the pendulum depends below sleeve 35 and is integral therewith. Inserted through the lower portion of pendulum 33, and held in place by a nut 46, is a guide pin 47 which extends beyond the pendulum, toward valve plate 32, and which is positioned parallel with the shaft 15. The pin 47 is also positioned somewhat to one side of the vertical, with the entire pendulum and strap 44 located along the length of sleeve 35 so that the pin 47 extends into slot 41 or other suitable recess of valve plate 32 thereby maintaining the slot at an angle in the order of 20 to 50 degrees from vertical, as shown in Figs. 3 and 5. The angle of the slot which gives optimum operation of the unit will be discussed hereinafter. The spring 34, which is wound concentrically about the sleeve 35, is held in compression between the valve plate 32 and the pendulum strap 44 thereby holding the valve plate sufficiently tight against the hub 13 to provide a seal, but at the same time not tight enough to prevent the plate from sliding when the wheel rotates. As stated hereinabove, in operation the pendulum remains stationary and in turn keeps the valve plate stationary through the cooperation between pin 47 and slot 41, whereby as the wheel rotates the valve plate functions as a sliding valve to successively open or close the passages to the spokes.

The modification shown in Fig. 8 discloses a variation in the valve assembly and its method of support. Extending substantially the length of the cylinder 12 is a pair of floats 51 which may be light, metal cylinders closed at their ends as at 52, and having substantially triangular-shaped plates 53 also rigidly attached to the ends of said cylinders. Through the top of said plates 53, and extending the full length of cylinder 12 is a supporting rod 54, which passes through the plate 53 so that it is held rotationally integral with the plates 53; said rod 54 tapering to a point at its extremities so that those pointed ends may be inserted in jewel bearings 55 mounted at each end of cylinder 12. On the lower edge of the plate 53 which is nearest the hub 13, there is a protuberance 56 through which is mounted the guide pin 47, secured by nuts 57, and it is to be noted that the pin 47 in this modification is displaced slightly to one side of the vertical center line of the plate 53. From the view of Fig. 8 it can be clearly seen that spring 34 abuts plate 53 to urge valve plate 32 against hub 13, just as shown in the preferred modification of Fig. 2.

In the modification of Fig. 8, the cap shaft 18 is hollow, as before, but here a portion of its length is threaded as at 58, so that it can be screwed in and out of end cap 14, thereby making possible slight adjustments in the contact between support rod 54 and jewel bearings 55. The nut 61 is integral with shaft 18 for making the adjustment, and lock-nut 62 holds it secure, while packing or sealing ring 63 forms a tight joint between end cap 14, shaft 18 and lock-nut 62. Filling plug 23 screws into the end of hollow shaft 18 to make an air-tight connection, after liquid 27 has been inserted; there being sufficient clearance between support rod 54 and jewel bearings 55 for the liquid to pass therebetween into cylinder 12.

Fig. 11 is a view of an alternate method of locating the filling plug 23 by placing it in the side of cylinder 12, with the inner end flush with the inside surface of the cylinder, rather than in the end of hollow shaft 18, but if this is done then a small counterweight should be placed diametrically opposite the plug to maintain the balance of the cylinder.

In operation, the rotation of the power unit is obtained by restricting the flow of vapor to a limited number of passages in such a manner that an unsymmetrical distribution of liquid is maintained in the spokes; this unsymmetrical distribution of mass causes rotation due to the action of gravity.

In setting up the power unit for operation the first time, the filling plug 23 is removed from cap shaft 18, and the volatile liquid 27 (of the type described hereinbefore), is inserted into the cylinder 12, care being taken to remove, by any well known means, all of the air and relatively non-condensible gases before resealing with plug 23. Enough liquid is put into the device to cover the lower portion of cylinder 12 and the lower portion of hollow wheel rim 25 as well as a portion of the lowermost spokes 26, as seen in Figs. 2 and 4. Next the wick 24 is dampened, and in a few moments the power unit will automatically begin to rotate, and will continue to rotate so long as wick 24 is kept wet. Once liquid 27 has been placed in the device, it does not normally need replacing.

When the unit is in operation, it should be noted that broadly speaking, the liquid 27 vaporizes in the wheel and recondenses in the cylinder. The wheel being relatively warm, approaching room temperature, readily vaporizes the volatile liquid 27 to form a pressure within the hollow rim 25 and most of the spokes 26. When the vapor passes through passages 26a into the cooler confines of cylinder 12, which is made relatively cool by the evaporation of the water in wick 24, the vapor immediately recondenses, forming a relatively low pressure within the cylinder.

Referring now to Fig. 4, the rotation of the wheel is in a clockwise direction, as seen from that view. The valve plate 32 is held stationary by its pendulum 33 while the hub 13 and spokes 26 (as well as the external wheel assembly) rotate; the valve plate 32 being held by the pin 47 on pendulum 33 so that the entering side of slot 41 is set at an angle "X" with the vertical. The angle "X," which may be from 20 to 50 degrees, is such that when a spoke is in the approximate position of spoke A (Fig. 4), further rotation will cause slot 41 to uncover passage 26a thereby connecting spoke A with cylinder 12 so as to permit vapor to flow from the spoke to the cylinder and at the same time permit excess liquid to flow from the cylinder into the spokes and rim. As the pressure in the spoke decreases, the higher pressure in the rim forces liquid into the spoke, thereby tending to fill the spoke with liquid, and this process continues as the spoke travels past the position of spoke B. Finally, as the spoke approaches a vertical position, the spoke passage 26a is covered by the surface 43 (Fig. 6) on the valve plate, which surface is at least as great as the diameter of 26a, thereby stopping further flow of the vapor, or liquid if the spoke has been filled completely, from the spoke to the cylinder.

Further movement of the spoke causes its passage 26a to be uncovered by the end of the annular groove 42, thereby equalizing the spoke pressure with that in the annular groove. It is to be noted that the groove 42 simultaneously connects all of the spokes except those that are opposite the flat surfaces 43 and the slot 41, as at positions A and B. When the passage 26a is uncovered by groove 42, this causes the liquid level in the spoke to fall immediately to that in the rim 25, as shown in position C, so that as the spoke moves away from the vertical position it contains less liquid than it did while approaching the vertical position. This process is repeated for each succeeding spoke with the result that those spokes between position A and the vertical contain more liquid than those between the vertical and position D, and the resulting unsymmetrical distribution of liquid causes the unit to rotate.

The cycle of operation for the modification of Fig. 8 is the same as that for the species of Fig. 2; the floats 51 and guide pin 47 holding valve plate 32 stationary so that the entering side of the slot makes an angle "X" with the vertical.

Experience has shown that several variables influence the optimum angle of travel during which the spokes 26 communicate with the cylinder 12 via the slot 41 in valve plate 32. Large angles cause the unbalanced liquid to have a greater moment about the axis of rotation and hence produce a greater torque; however, this requires a higher liquid level in the rim 25 (since the "active" spokes should have their lower ends submerged) and the retarding effect of the liquid, which does not rotate with the wheel, is greater. Tests of units geometrically similar to those disclosed indicate that the optimum angle ranges from 20 to 50 degrees although the power unit will operate at angles somewhat above and below these figures.

The passages 26a leading from the spokes to the cylinder 12 should be large enough to prevent capillary action from sealing off the vapor flow as the condensate drains back in the opposite direction. Tests indicate that for circular passages a diameter of about $\frac{3}{16}$ inch or greater is satisfactory, although diameters somewhat smaller may be used with liquids having small surface tensions.

Furthermore, smoother operation results when the passages 26a and valve plate slot 41 are proportioned so that the slot uncovers an entering passage before the leaving passage is covered. In other words, slot 41 may be so proportioned that for an instant both spokes A and B are connected to cylinder 12 as they move toward the vertical, thereby increasing the average torque produced by the unbalanced liquid.

While the above description has dealt with the preferred modification of the invention, it is to be understood that various changes in size, shape, method of operation and arrangement of parts may be resorted to without departing from the spirit and scope of the invention. Increased efficiency of operation may be obtained by the addition of fins 19 (Figs. 12 and 13) which may be circular disks placed around the periphery of cylinder 12, or other means for extending the cooling surface of cylinder 12, or by constructing the rim and spokes which are receiving heat from the atmosphere, of a material whose surface has a high absorptivity or by coating the surface with a thin layer of dull black paint. Furthermore, a light bulb 20 (Fig. 12) or any other source of low intensity heat may be directed on the rim and spokes, in which case the wick 24 may not be required, since cylinder 12 will be maintained at a temperature lower than that at the rim, due to radiation and convection to the surroundings.

Thus from the above specification it can be clearly seen that there is disclosed a rotary power unit which operates under conditions of small temperature difference, one which operates without fuel but on energy obtained from the atmosphere, one whose working fluid is hermetically sealed within the power unit, and one which has utility as an aid to training, advertising, amusement and the like.

The invention described herein may be manufactured and used by or for the Government of the United States of America for governmental purposes without the payment of any royalties thereon or therefor.

What is claimed is:

1. A self-contained power unit comprising an evacuated hollow wheel having a plurality of hollow spokes, an evacuated hollow cylinder at a cooler temperature than the wheel, a heat sensitive liquid partially filling said wheel and cylinder, said liquid being adapted to vaporize when in proximity with said wheel and condense when in proximity with said cooler hollow cylinder, and a valve connecting the wheel and spokes with the hollow cylinder for permitting said spokes to fill with said heat sensitive liquid as they approach the vertical and to empty as they leave the vertical whereby the unsymmetrical distribution of the heat sensitive liquid causes the power unit to rotate.

2. A self-contained rotary power unit comprising an evacuated hollow member, supports at each end of said member to permit rotation, a heat sensitive medium in said hollow member, a warm portion and a cool portion associated with said hollow member and in spaced relation with respect to each other, said warm portion being substantially wheel-shaped and having a plurality of hollow spokes, said medium being adapted to vaporize when in proximity with said warm portion and condense when in proximity with said cool portion, said condensed medium adapted to flow from said cool portion to said warm portion, said vapor adapted to flow from said warm portion to said cool portion, the vapor from said medium acting to cause an unsymmetrical distribution of the condensed medium within the hollow member thereby to cause said hollow member to rotate.

3. A self-contained rotary power unit comprising an evacuated hollow member, supports at each end of said member to permit rotation, a heat sensitive medium in said hollow member, a warm portion and a cool portion associated with said hollow member and in spaced relation with respect to each other, said warm portion being substantially wheel-shaped and having a plurality of hollow spokes, said medium being adapted to vaporize when in proximity with said warm portion and condense when in proximity to said cool portion, said condensed medium adapted to flow to said warm portion and said vapor to flow to said cool portion, means for periodically connecting said warm and cool portions, the vapor from said medium causing an unsymmetrical distribution of said condensed medium within the hollow member when the warm and cool portions are interconnected thereby causing said hollow member to rotate.

4. A self-contained rotary power unit comprising an evacuated hollow member having a warm portion and a cool portion associated therewith, supports at each end of said member to permit rotation, said warm portion being substantially wheel-shaped and having a plurality of hollow spokes, a heat sensitive medium in said hollow member adapted to vaporize when in proximity with said warm portion and condense when in proximity with said cool portion, said condensate arranged to flow to said wheel shaped warm portion, means for successively connecting each hollow spoke with said cool portion, said vapor acting to force condensate into a hollow-spoke when it is connected with said cool portion, whereby the unsymmetrical distribution of the condensate within the hollow member causes it to rotate.

5. A rotary power unit comprising an evacuated hollow member having a warm portion and a cool portion associated therewith, supports at each end of said hollow member to permit rotation, said warm portion being wheel-shaped and having a hollow rim and a plurality of hollow spokes, said cool portion being cylindrical in shape and integrally attached to the hub of said wheel, a heat sensitive medium in said hollow member adapted to vaporize when in proximity with said warm portion and condense when in proximity with said cool portion, passages connecting each of said hollow spokes with the cool portion, and valve means between said warm and cool portions for successively uncovering said passages so that the spokes are successively filled with said condensed medium, whereby the unbalanced weight of the medium in said wheel causes the hollow member to rotate.

6. The power unit of claim 5 wherein the valve means acts to uncover the passage to each hollow spoke when said spoke is from 20 to 50 degrees with the vertical.

7. The power unit of claim 5 wherein the valve means consists of a circular disk having a radial slot therein, said radial slot acting to successively uncover the aforementioned passages.

8. The power unit of claim 5 wherein the valve means consists of a circular disk having a radial slot therein, said circular disk also having in one face an annular groove whose ends terminate on each side of said slot, a pendulum whose axis of suspension coincides with the axis of said disk, and a guide pin integral with said pendulum and positioned to prevent relative rotation between the circular disk and the pendulum.

9. The power unit of claim 5 wherein the valve means consists of a circular disk having a radial slot therein, said circular disk also having in one face an annular groove whose ends terminate on each side of said slot, a plurality of floats integrally joined by end plates, said floats being pivotally mounted on a rod through the end plates, and a guide pin mounted in one end plate and positioned to prevent relative rotation between the circular disk and the floats.

10. A self-contained power unit comprising an evacuated wheel having a hollow rim and a plurality of evenly spaced hollow spokes, an evacuated cylinder integrally attached to the hub of said wheel, a volatile liquid partially filling said hollow rim and cylinder, the liquid being adapted to vaporize in said rim and condense in said cylinder, a plurality of passages for connecting the spokes with said cylinder, a circular disk having a radial slot therein for successively uncovering the passages as the power unit rotates, said circular disk having an annular groove whose ends terminate on each side of the slot, and a positioning means including a guide pin arranged to contact said circular disk and maintain said disk stationary as said power unit rotates, whereby said slot permits each spoke to fill with liquid as it approach the vertical and said annular groove permits each spoke to empty as it leaves the vertical so that the unbalanced distribution of liquid within said power unit causes it to continue rotating over long periods of time.

11. A self-contained rotary power unit comprising an evacuated hollow member having a warm portion and a cool portion associated therewith, supports at each end of said member to permit rotation, said warm portion being substantially wheel-shaped and having hollow spokes, said cool portion being cylindrically shaped and having a plurality of circular fins positioned about its periphery, a heat sensitive medium in said hollow member adapted to vaporize when in proximity with said warm portion and condense when in proximity with said cool portion, means connecting the warm and cool portions to permit said condensate to flow to said wheel-shaped warm portion, means for successively connecting each hollow spoke with the cool portion, said vapor acting to force condensate into a hollow spoke when it is connected with said cool portion, whereby the unsymmetrical distribution of the condensate within the hollow wheel causes it to rotate.

12. A self-contained rotary power unit comprising an evacuated hollow member having a warm portion and a cool portion associated therewith, supports at each end of said member to permit rotation, said warm portion being substantially wheel-shaped and having a plurality of hollow spokes, said cool portion being cylindrically shaped and having a plurality of circular fins positioned about its periphery, a heat sensitive medium in said hollow member adapted to vaporize when in proximity with said warm portion and condense when in proximity with said cool portion, means for successively connecting each hollow spoke with the cool portion, said last mentioned means simultaneously permitting a portion of the vapor to flow from the warm portion to the cool portion while a portion of the condensate flows from the cool portion to the warm portion, another portion of the vapor acting to force condensate into a hollow spoke when the spoke is connected to the cool portion whereby the unsymmetrical distribution of the condensate within the hollow wheel causes it to rotate.

IVAN MONK.

REFERENCES CITED

The following references are of record in the file of this patent:

UNITED STATES PATENTS

| Number | Name | Date |
| --- | --- | --- |
| 50,151 | Monson | Sept. 26, 1865 |
| 389,515 | Iske | Sept. 11, 1888 |

FOREIGN PATENTS

| Number | Country | Date |
| --- | --- | --- |
| 295 | Great Britain | Jan. 7, 1888 |